United States Patent [19]

Harada et al.

[11] Patent Number: 4,693,143
[45] Date of Patent: Sep. 15, 1987

[54] CONTROL DEVICE FOR AN AUTOMATIC TRANSMISSION SYSTEM

[75] Inventors: Yoshiharu Harada, Toyota; Yutaka Taga, Aichi; Kagenori Fukumura, Toyota; Yoichi Hayakawa, Toyoake; Masao Kawai, Chiryu, all of Japan

[73] Assignees: Toyota Jidosha Kabushiki Kaisha; Aisin-Warner Kabushiki Kaisha, both of Aichi, Japan

[21] Appl. No.: 820,155

[22] Filed: Jan. 21, 1986

[30] Foreign Application Priority Data

Jan. 19, 1985 [JP] Japan ................ 60-07765

[51] Int. Cl.$^4$ ............ B60K 41/18; B60K 37/00
[52] U.S. Cl. .................... 74/866; 180/247; 74/740
[58] Field of Search .......... 74/869, 868, 867, 866, 74/740; 180/247

[56] References Cited

U.S. PATENT DOCUMENTS

| | | | |
|---|---|---|---|
| 4,388,843 | 6/1983 | Teeter | 74/477 X |
| 4,411,174 | 10/1983 | Yokoi et al. | 74/866 |
| 4,444,073 | 4/1984 | Moroto et al. | 74/740 X |
| 4,466,502 | 8/1984 | Sakai | 180/247 |
| 4,484,654 | 11/1984 | Hayakawa | 74/867 X |
| 4,503,927 | 3/1985 | Hayakawa et al. | 180/247 |
| 4,552,036 | 11/1985 | Takamo et al. | 180/247 X |
| 4,561,325 | 12/1985 | Jester | 74/477 X |
| 4,582,159 | 4/1986 | Suzuki | 180/247 |
| 4,586,583 | 5/1966 | Yamakawa et al. | 180/247 |
| 4,592,442 | 6/1986 | Wilson et al. | 180/247 |

Primary Examiner—Leslie Braun
Assistant Examiner—Dirk Wright
Attorney, Agent, or Firm—Wegner & Bretschneider

[57] ABSTRACT

A transmission system of the present invention which has a main transmission and a sub transmission includes a first output shaft speed detecting means for detecting the rotational speed of the output shaft of the main transmission and a second output shaft speed detecting means for detecting the rotational speed of the sub transmission. The thus arranged transmission system of this invention makes it possible to accurately detect the state of the main transmission by providing the first output shaft speed detecting means for detecting the rotational speed of the output shaft of the main transmission as well as the second output shaft speed detecting means for detecting the rotational speed of the output shaft of the sub transmission.

4 Claims, 9 Drawing Figures

CONTROL DEVICE FOR AN AUTOMATIC TRANSMISSION SYSTEM

BACKGROUND OF THE INVENTION

The present invention relates to a transmission system having a main transmission and a sub transmission.

In a known transmission system which has a main transmission and a sub transmission, e.g., a four-wheel drive automatic transmission system, the sub transmission is automatically changed over to a lower speed mode only when the vehicle running speed is determined to be lower than a predetermined speed. To achieve this operation, a governor valve which produces the oil pressure in accordance with the rotational speed of the main transmission is provided either on the output shaft of the main transmission or on the input shaft of the sub transmission, and the speed change mechanism of the sub transmission is controlled by the governor pressure produced by the governor valve.

The above-mentioned conventional transmission system employs a governor valve as a main transmission output shaft speed sensing means. Since the governor valve converts the rotational speed of the output shaft of the main transmission to a hydraulic pressure, it is impossible for a known transmission system to incorporate an electric controller or a computer in which the shift change mechanism and the speed change mechanism are automatically controlled by means of the speed change signal which is determined by the computer in accordance with the state of the running of the vehicle in terms of such factors as vehicle running speed, throttle opening, the rotational speed of the output shaft of the main transmission and so forth. It has also been proposed that a speed sensor be provided which converts the speed of rotation of the output shaft of the sub transmission to an electric signal so as to detect the rotational speed corresponding to the rotational output of the sub transmission. In the case that the shift control of the main transmission is performed by means of the rotational speed of the output shaft of the sub transmission, when the speed mode of the sub transmission is changed, for example, from a high speed to a low speed, the rotational speed of the output shaft of the main transmission is raised in accordance with the gear ratio. However, the rotational speed of the output shaft of the sub transmission remains the same if the vehicle running speed is kept the same, and the current transmission gear selected by the main transmission is not shifted up even if the rotational speed of the engine is high. Similarly, when the speed mode of the sub transmission is changed from the low speed to the high speed, the rotational speed of the output shaft of the main transmission is lowered in accordance with the gear ratio. However, the rotational speed of the output shaft of the sub transmission remains the same if the vehicle running speed is kept the same, and the current transmission gear selected by the main transmission is not shifted down, even if the rotational speed of the engine is low. It has also been proposed that the shift control of the main transmission be effected by employing the rotational speed of the output shaft of the sub transmission which is obtained by multiplying the detected rotatonal speed by the gear ratio of the current speed mode of the sub transmission. In this method, however, it is impossible to accurately obtain the rotational speed of the output shaft during the time when the speed mode of the sub transmission is being changed, thereby making it difficult to control the main transmission accurately.

SUMMARY OF THE INVENTION

In view of the above-mentioned disadvantages of the prior art, it is an object of the present invention to provide a transmission system which is capable of accurate control of a main transmission by providing a first output shaft speed detecting means for detecting the rotational speed of the output shaft of a main transmission and a second output shaft speed detecting means for detecting the rotational speed of the output shaft of a sub transmission.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

To achieve the above-mentioned object, a transmission system according to the present invention which has a main transmission and a sub transmission includes a first output shaft speed detecting means for detecting the rotational speed of the output shaft of the main transmission and a second output shaft speed detecting means for detecting the rotational speed of the output shaft of a sub transmission. Further, the transmission system according to the present invention has an electronic control device for controlling the speed changing ratios of the main and sub transmissions.

By virtue of the above-mentioned arrangement, the transmission system of the present invention makes it possible to accurately detect the state of the main transmission by providing the first output shaft speed detecting means for detecting the speed of the output shaft of the main transmission and the second output shaft speed detecting means for detecting the speed of the output shaft of the sub transmission.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

The transmission system of the invention will be fully understood from the following description of preferred embodiments when the same is read in conjunction with the accompanying drawings.

Figure 1:
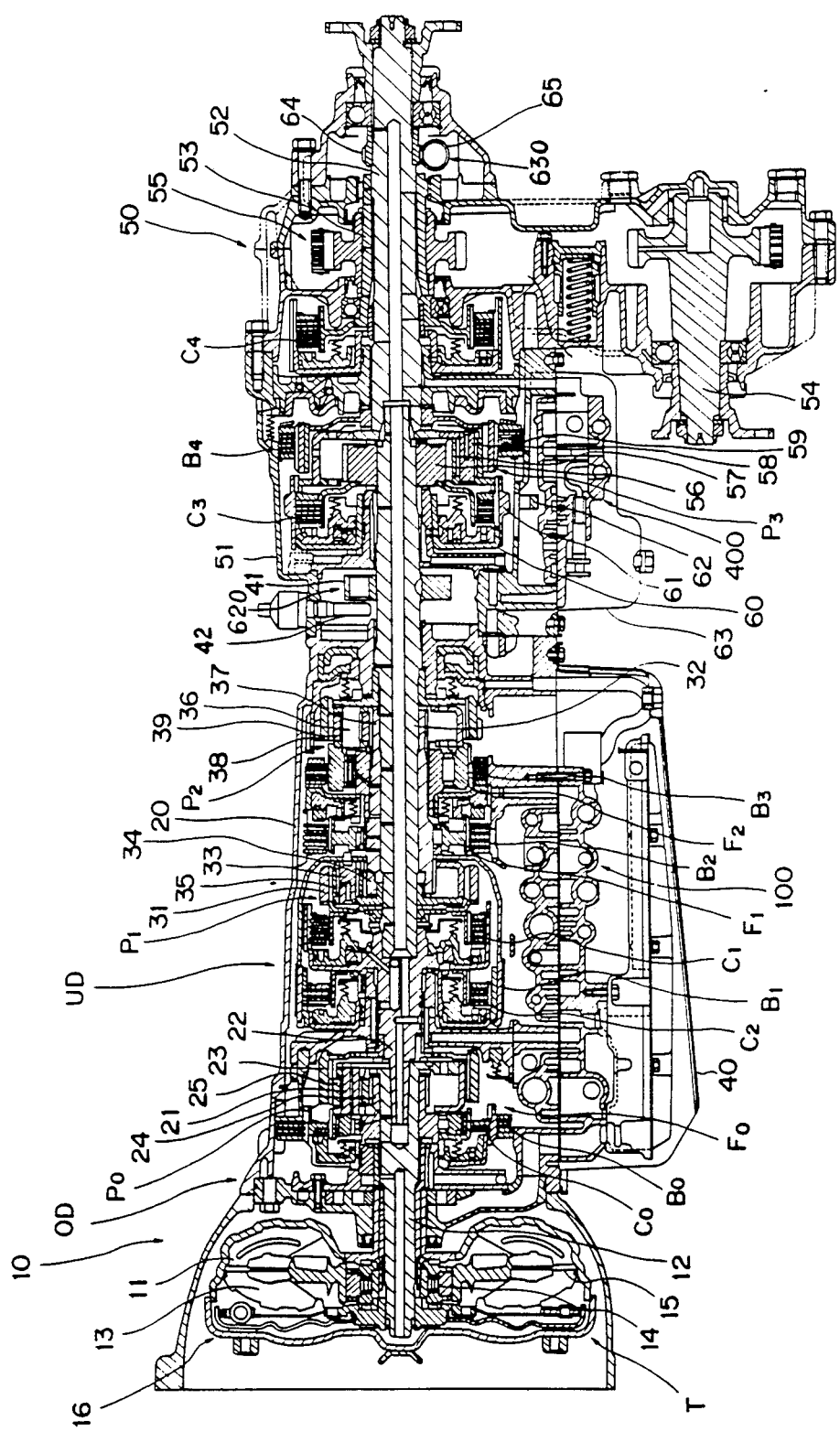
FIG. 1 is a sectional view of a four-sheel drive transmission system.
Figure 2:
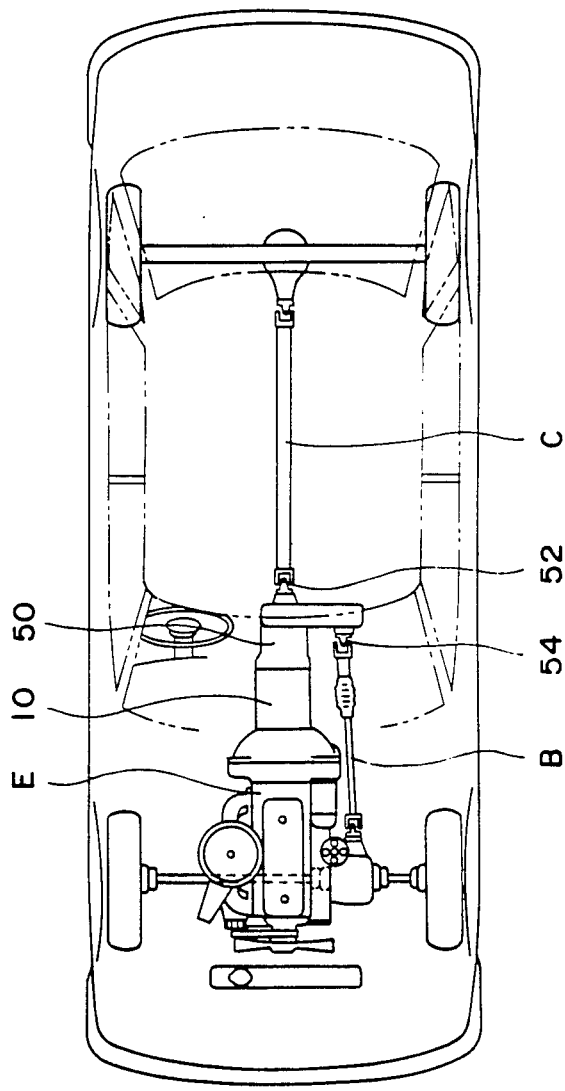
FIG. 2. is a schematic view of a driving mechanism of a four-wheel drive vehicle.

FIG. 1 is a sectional view of a transmission system according to the present invention which is composed mainly of a four-speed automatic transmission having four forward speed gears and one reverse gear, and a four-wheel drive sub transmission. FIG. 2 schematically shows a four-wheel drive vehicle in which is mounted the transmission system shown in FIG. 1.

Referring first to FIG. 1, the transmission system includes a main transmission 10 which is a four-speed automatic transmission with an overdrive, and a four-wheel drive sub transmission 50 which is coupled to the output side of a planetary gear system incorporated in the main transmission 10. The main transmission 10 is directly mounted on an engine E and has an output shaft 32 which constitutes an input shaft of the four-wheel drive sub transmission 50. The sub transmission 50 has two output shafts' namely, a first output shaft 52 coupled to a rear-wheel drive propeller shaft C and a second output shaft 54 coupled to a front-wheel drive propeller shaft B.

The main transmission 10 is constituted by a fluid type torque converter T, an overdrive mechanism OD and an underdrive mechanism UD having three forward speed gears and one reverse gear.

The torque converter T has a pump impeller 11 coupled to the output shaft of the engine E, a turbine impeller 13 coupled to the output shaft 12 of the torque converter T, a stator 15 connected to a stationary part through a one-way clutch 14, and a direct clutch 16. The output shaft 12 of the torque converter T serves as the input shaft of the overdrive mechanism OD.

The overdrive mechanism OD includes frictional engagement means such as a multi-disc clutch C0, multi-disk brake B0 and a one-way clutch F0, and a planetary gear device P0. The planetary gear device P0 has various constituent parts which are brought into and out of engagement with other parts such as a stationary part, e.g., a main transmission case 20, input shaft, output shaft and other parts, in accordance with the respective states of selective engagement of the above-mentioned frictional engagement means.

More specifically, the planetary gear device P0 has a carrier 21 connected to the output shaft 12, a ring gear 23 connected to the output shaft 22 of the overdrive mechanism OD, a sun gear 24 rotatably carried by the input shaft 12 and fixed to the main transmission case 20 through the brake B0, the sun gear 24 being connected to the carrier 21 through the clutch C0 and also through the one-way clutch F0 parallel to the clutch C0 and planetary pinions 25 rotatably carried by the carrier 21 and held in meshing engagement with the sun gear 24 and the ring gear 23.

The output shaft 22 of the overdrive mechanism OD serves as the input shaft of the underdrive mechanism UD which has three forward speed gears and one reverse gear.

The underdrive mechanism UD has frictional engagement means such as multi-disc clutches C1 and C2, a belt brake B1, multi-disc brakes B2 and B3, one-way clutches F1 and F2, a primary planetary gear device P1 and a secondary planetary gear device P2.

The primary planetary gear device P1 includes a ring gear 31 connected to the output shaft 22 through the clutch C1, a carrier 33 connected to the output shaft 32 of the underdrive mechanism UD, a sun gear 34 connected to the output shaft 22 through the clutch C2 and fixed to the main transmission case 20 through the belt brake B1 and also through a series connection of the one-way clutch F1 and the brake B2 which is parallel to the brake B1 and planetary pinions 35 rotatably carried by the carrier 33 and held in meshing engagement with the sun gear 34 and the ring gear 31.

The secondary planetary gear device P2 includes a carrier 36 which is fixed to the main transmission case 20 through the brake B3 and also through the one-way clutch F2 parallel to the brake B3, a sun gear 37 formed integrally with the sun gear 34 of the primary planetary gear device P1, a ring gear 38 connected to the output shaft 32, and planetary pinions 39 rotatably carried by the carrier 36 and held in meshing engagement with the sun gear 37 and the ring gear 38.

A main hydraulic controller 100 is accommodated by an oil pan 40 connected to the underside of the main transmission case 20 and is provided at the underside thereof with an oil strainer 101. The main hydraulic controller 100 operates in accordance with various factors representing the state of running of the vechicle, e.g., throttle opening of the engine E, vehicle running speed and so forth, so as to selectively engage and disengage the clutches and brakes, thereby effecting gear change over four forward speed gears including the overdrive O/D and the reverse gear which is selected manually.

The sub transmission 50 has a sub transmission case 51 which is coupled to the rear end of the main transmission case 20 by means of a plurality of bolts, such that the output shaft 32 of the main transmission 10 constitutes the input shaft of the sub transmission 50. More specifically, the sub transmission 50 has frictional engagement means such as a clutch C3, a brake B4 and a clutch C4 which are driven by the input shaft constituted by the common output shaft of the planetary gear devices P1 and P2. The sub transmission 50 has a first output shaft 52 connected in series to the output shaft 32, a planetary gear device P3 interposed between the output shaft 32 and the first output shaft 52, a four-wheel drive sleeve 53 rotatably fitted around the first output shaft 52, a second output shaft 54 disposed in parallel with the output shaft 32 and projecting in the direction opposite to the first output shaft 52, and a transfer mechanism 55 through which the sleeve 53 is connected to the second output shaft 54. The planetary gear device P3 includes a sun gear 56 splined to the end of the output shaft 32, planetary pinions 57 meshing with the sun gear 56, a ring gear 58 meshing with the planetary pinions 57, and a carrier 59 rotatably carrying the planetary pinions 57 and connected to the free end of the first output shaft 52 of the sub transmission 50. A parking gear 61 is formed on the outer peripheral surface of a cylinder 60 which is connected to the carrier 59. The arrangement is such that, when a shift lever (not shown) of the main transmission 10 is operated to select a parking position, a stopper 62 engages with the parking gear 61 thereby fixing the first output shaft 52.

The frictional engagement means, i.e., clutches and brakes, of the sub transmission 50 are selectively operated to be engaged and disengaged by a sub hydraulic controller 400 which is disposed in an oil pan 63 under the sub transmission case 51.

The sub transmission case 51 of the sub transmission 50 is connected to the main transmission case 20 of the main transmission 10 at its rear end, and a rotor 41 which incorporates therein a permanent magent is secured by means of a woodruffkey, snap ring or other fastening means to the outer peripheral surface of the output shaft 32 of the main transmission 10 at the rear side of the output shaft where the sub transmission case 51 is coupled. A reed switch 42 is connected to a computer 600, and is energized when it approaches the permanent magent contained in the rotor 41 and is de-energized when it separates therefrom. The reed switch 42 is mounted on the sub transmission case 51 in such a manner as to be located at the side of the rotor 41 which is closer to the main transmission 10 but not to be in contact with the rotor 41. The rotor 41 and the reed switch 42 together constitute a first output shaft speed detecting means 620 for detecting the rotational speed of the output shaft 32 of the main transmission 10. A drive gear 64 which is the worm-wheel of a worm-gear is mounted on the outer peripheral surface of the first output shaft 52 of the sub transmission 50 at the rear side of the sub transmission case 51 (extension housing), while a driven gear 65 is mounted on the drive gear 64 which is a worm engaged with the drive gear 64 so as to detect the rotational speed of the first output shaft 52. The drive gear 64 and the driven gear 65 together constitute a second output shaft speed detecting means 630 for detecting the rotational speed of the first output shaft 52 of the sub transmission 50.

Figure 3:
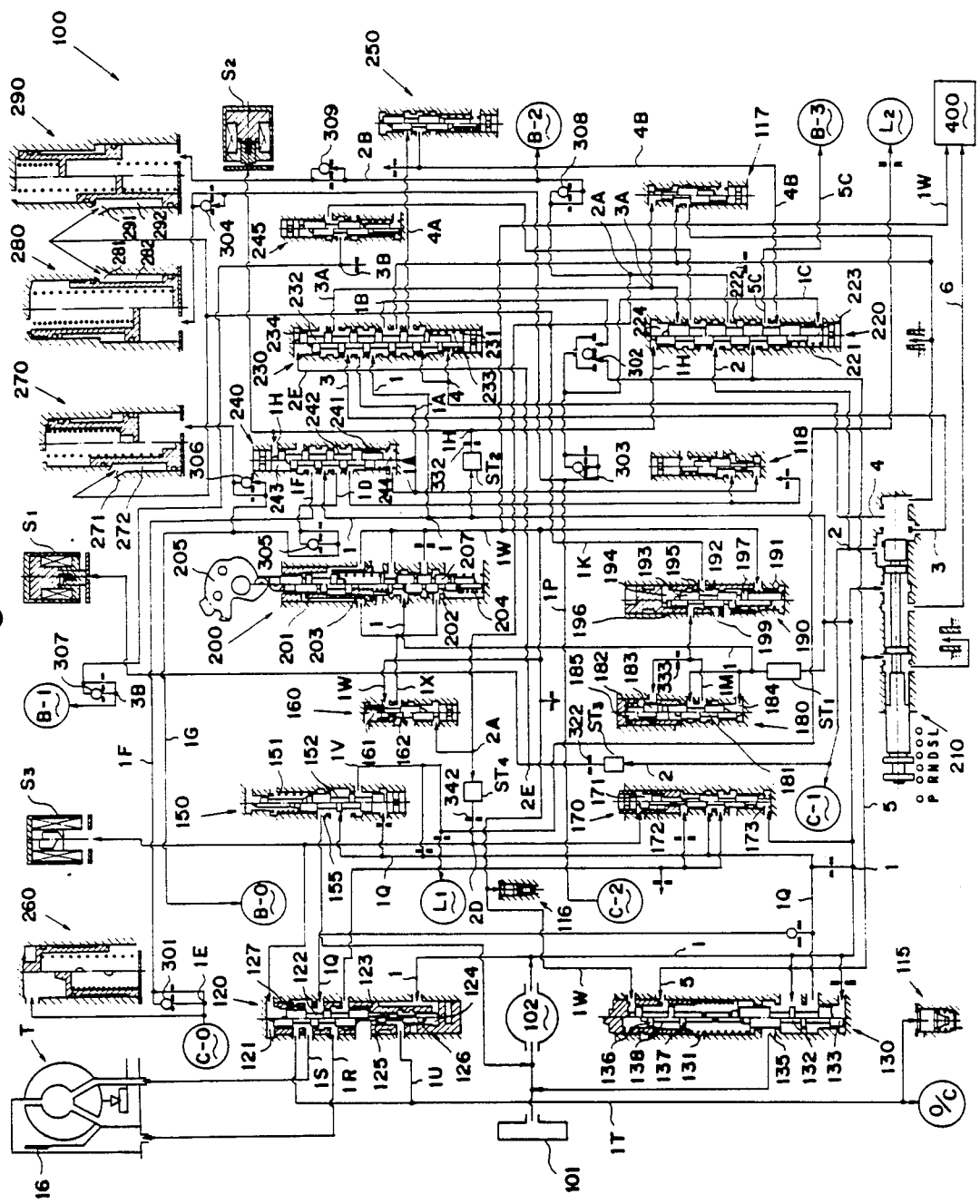
FIG. 3 is a hydraulic pressure circuit diagram of a hydraulic controller of a main transmission.

FIG. 3 shows the detail of the main hydraulic controller 100 for controlling the main transmission 10.

As will be seen from this Figure, the main hydraulic controller 100 has the following parts an oil strainer 101; an oil pump 102; a cooler by-pass valve 115 for regulating the oil pressure in an oil cooler O/C; a pressure relief valve 116; a release clutch control valve 117; a release brake control valve 118; a lock-up relay valve 120; a pressure regulator valve 130 for regulating the pressure of a working fluid or oil which is supplied by the oil pump 102 to an oil passage 1; a second pressure regulator valve 150 through which the oil is supplied both to a lubricating oil supply passage Ll leading to the main transmission 10 and a working oil supply passage L2 for the sub transmission 50; a cut-back valve 160; a lock-up control valve 170; a first accumulator control valve 180; a second accumulator control valve 190; a throttle valve 200; a manual valve 210 which distributes the line pressure in the oil passage 1 selectively to oil passages 2 to 6; a 1-2 shift valve 220; a 2-3 shift valve 230; a 3-4 shift valve 240; an intermediate coast modulator valve 245 which regulates the pressure of the oil supplied to the brake B1; a low coast modulator valve 250 for regulating the pressure of the oil supplied to the hydraulic servomotor B-3; an accumulator 260 for smoothing the engagement of the clutch C2; an accumulator 270 for smoothing the engagement of the brake B0; an accumulator 280 for smoothing the engagement of the clutch C2; an accumulator 290 for smoothing the engagement of the brake B2; hydraulic servomotors C-0, C-1 and C-2 for the clutches C0, C1 and C2; hydraulic servomotors B-0, B-1, B-2 and B-3 for the brakes B0, B1, B2 and B3; flow-rate control valves for controlling the flow rates of oil flowing therethrough, the flow-rate control valves being respectively denoted by 301, 303, 304, 305, 306, 307, 308 and 309 and provided with respective check valves; a shuttle valve 302; oil strainers ST1, ST2, ST3 and ST4; a first solenoid valve S1 adapted for controlling the 2-3 shift valve 230 under the control of a later-mentioned electronic controller or computer 600; a second solenoid valve S2 adapted for controlling both the 1-2 shift valve 220 and the 3-4 shift valve 240 under the control of the computer 600; a third solenoid valve S3 adapted to control both the lock-up relay valve 120 and the lock-up control valve 170 under the control of the computer 600; and oil passages providing communication between the valves and the hydraulic cylinders of respective clutches and brakes.

The working oil is sucked by the hydraulic pump 102 from the oil pan 40 through an oil strainer 101, and is supplied to the oil passage 1 at a predetermined line pressure regulated by the pressure regulator valve 130.

The pressure regulator valve 130 has a spool 132 which is urged by a spring 131 disposed on the upper side thereof as viewed in FIG. 3, and a plunger 138 disposed in series with and in contact with the spool 132. In operation, a throttle pressure introduced through an oil passage 1W and acting on the uppermost land 136 of the plunger 138 produces a force which, together with the force produced by the spring 131, acts to cause a downward displacement of the spool 132. When reversing, downward force is produced also by the line pressure introduced through the oil passage 5 and acting on the lowermost land 137 of the plunger 138, in addition to the downward force produced by the throttle pressure and the spring 131. On the other hand, the line pressure is fed back to the lowermost land 133 of the spool 132 so as to produce a force which acts to displace the spool 132 upwardly. In consequence, the spool 132 is displaced to a position where the upward force and the downward force balance each other, so as to change the area of communication between the oil passage 1 and the oil passage 1Q, as well as the area of communication between the oil passage 1 and the drain port 135, thereby maintaining the line pressure at a level corresponding to the state of running of the vehicle.

The throttle valve 200 has a throttle plunger 201 which is adapted to be displaced by a cam 205 which in turn is rotated in accordance with the amount by which the accelerator pedal is depressed. The throttle valve 200 also has a spool 202 disposed on the lower side of the throttle plunger 201 as viewed in FIG. 3 with a spring 203 acting as an intermediary therebetween. The stroking of the throttle plunger 201 causes an axial movement of the spool 202 through the action of the spring 203 so that the spool 202 changes the line pressure supplied from the oil passage 1 to the throttle pressure corresponding to the throttle opening and delivers the throttle pressure to the oil passage 1W.

The second pressure regulator valve 150 has a spool 152 which is urged by a spring 151 acting on the upper side thereof as viewed in FIG. 3. The spool 152 is axially displaced to a position where a balance is obtained between the downward force exerted by the spring 151 and an upward force which is generated by an oil pressure fed back through the oil passage 1Q and acting on the lower side thereof, thus varying the area of communication between the oil passage 1Q and the lubricating oil supply passage 1V, as well as the area of communication between the oil passage 1Q and the drain port 155, thereby regulating the pressure in the oil passage 1Q to a predetermined secondary line pressure (torque converter pressure), while delivering excessive oil to the oil passage 1V. The oil supplied to the oil passage 1V is distributed both to the lubricating oil passage L1 of the main transmission 10 and the working oil supply passage L2 leading to the sub transmission 50.

The manual valve 210 is directly connected to the shift lever arranged in the vicinity of the driver's seat, and is adapted to take one of the positions P (parking), R (reverse), N (neutral), D (drive), S (second) and L (low) as the shift lever is manually operated such as to select one of the ranges P, R, N, D, S and L.

The first solenoid valve S1, when not energized, blocks the oil passage 2E which is communicated with the oil passage 2 through an orifice 322. In this state, a solenoid pressure of high level equal to that of the line pressure is maintained in the oil passage 2E. However, when energized, the first solenoid valve S1 allows the oil passage 2E to communicate with the drain, so that the solenoid pressure in the oil passage 2E is reduced to a low level.

Similarly, the second solenoid valve S2 operates, when not energized, to establish a high solenoid pressure in the oil passage 1H which communicates with the oil passage 1 through an orifice 332 and, when energized, to drain the oil in the oil passage 1H thereby reducing the solenoid pressure to a low level.

The third solenoid valve S3 controls the pressure in an oil chamber 121 which is formed on the upper side of the lock-up relay valve 120 as viewed in FIG. 3 and connected to the oil passage 2D which in turn is communicated with the oil passage 2A through an orifice 342. The third solenoid valve S3 also controls the pressure in an oil chamber 171 which is formed on the upper side of the lock-up control valve 170 as viewed in FIG. 3. More specifically, the third solenoid valve S3 operates, when energized, to establish a high solenoid pressure in the oil chambers 121 and 171 thereby displacing the spools 122 and 172 downwardly as viewed in FIG. 3, whereas, when de-energized, it allows the oil chambers 121 and 171 to be drained so as to reduce the solenoid pressure to a low level, thereby allowing the spools 122 and 172 to return to the upper positions by virtue of the force produced by the line pressure derived from the oil passage 1 and the forces of the springs 123 and 173.

The 1-2 shift valve 220 has a spool 222 which is urged by a spring 221 acting on the lower side thereof as viewed in FIG. 3. When the solenoid pressure of high level is maintained in the oil passage 1H by the second solenoid valve S2 which is not energized, this high solenoid pressure is introduced into an oil chamber 224 which is defined on the upper side of the 1-2 shift valve 220, so that the spool 222 is moved downwardly to a first speed position. Conversely, when the second solenoid valve S2 is energized to drain the oil passage 1H and thereby to reduce the solenoid pressure to the low level, the spool 222 is returned to the upper position, away from the first speed position. When a third speed or a fourth speed is selected, the line pressure is introduced into an oil chamber 223 which is formed on the lower side of the spool 222 through the oil passage 1, 2-3 shift valve 230 and then through the oil passage 1C which is communicated with the oil passage 1B, so that the spool 222 is held at the upper position regardless of the level of the solenoid pressure.

The 2-3 shift valve 230 has a spool 232 urged by a spring 231 acting on the lower side thereof, as viewed in FIG. 3. When the first solenoid valve S1 is energized, the solenoid pressure in the oil passage 2E takes the low level, so that the spool 232 is held by the force of the spring 231 at an upper position, as viewed in FIG. 3, where it serves for first and second speeds, as well as for reversing. Conversely, when the first solenoid valve S1 is not energized, high solenoid pressure established in the oil passage 2E is applied to an oil chamber 234 so as to produce a force which acts to displace the spool 232 downwardly, as viewed in FIG. 3, to a lower position where it serves for the third speed and fourth speed operations. However, when the line pressure is supplied to an oil chamber 233 which is formed on the lower side of the spool 232, the spool 232 is fixed at the upper position regardles of the level of the solenoid pressure.

The 3-4 shift valve 240 has a spool 242 which is urged by a spring 241 acting on the lower side thereof. When the second solenoid valve S2 is not energized, the solenoid pressure of the high level is introduced through the oil passage 1H into an oil chamber 243 on the upper side of the spool 242, so that the spool 242 is held at a lower position as viewed in FIG. 3 where it serves for fourth speed (overdrive) operation. In contrast, when the second solenoid valve S2 is energized, the oil passage 1H is drained so that the spool 242 is set at an upper position where it serves for operations other than that for the fourth speed. When the line pressure is fed to an oil chamber 244 defined on the lower side of the spool 242 from the oil passage 1 or the oil passage 3 via the 2-3 shift valve 230 and the oil passage 1A, the spool 242 is fixed at the upper position by the force generated by the line pressure and the force of the spring 241.

The cut-back valve 160 has a spool 162 which is displaced by a downward force exerted by a spring 161 and an upward force produced by the line pressure introduced through the oil passage 2A. More specifically, when the line pressure is supplied through the oil passage 2A, the spool 162 is set at the upper position as viewed in FIG. 3 so as to bring the oil passage 1X into communication with the oil passage 1W which maintains the throttle pressure mentioned before, thereby outputting the throttle pressure as the cut-back pressure which is applied to the lower land 207 of the spool 202 of the throttle valve 200, thereby reducing the level of the throttle pressure in the oil passage 1W. The reduction in the throttle pressure causes the spool 132 of the pressure regulator valve 130 to move upwardly, thereby allowing the line pressure in the oil passage 1 to be relieved through a drain port 135, thus effecting a so-called "cut-back" of the line pressure.

The first accumulator control valve 180 has a spool 181 disposed at a lower portion thereof as viewed in FIG. 3, and a plunger 183 connected in series to the spool 181 and downwardly urged by a spring 182. In operation, the spool 181 is axially displaced so as to attain a balance between an upward force produced by the line pressure introduced into a lower oil chamber 184 through the oil passage 1 and a downward force which is the sum of the force of the spring 182 and the force produced by the output pressure fed back from the oil passage 1M to an upper oil chamber 185 through an orifice 333, thereby producing the output pressure through regulating the line pressure which is transmitted from the oil passage 1. The thus obtained output pressure is delivered to the second accumulator control valve 190 through the oil passage 1M.

The second accumulator control valve 190 has a spool 192 which is urged by a spring 191 acting on the lower side thereof. The spool 192 has an upper land 193 in which is formed an orifice 196 which provides communication between an upper oil chamber 194 formed on the upper side of the spool 192 and an intermediate oil chamber 195 formed under the land 193. The spool 192 is axially displaced upon balance being attained between an upward force which is the sum of the force exerted by the spring 191 and the force produced by a throttle modulator pressure which acts on a lower land 197 of the spool 192 through the oil passage 1W, and a downward force which is produced by a feedback pressure from the oil passage 1M to act in the upper oil chamber 194 through the orifice 196, thereby producing an output pressure at the oil passage 1M. The output pressure from the oil passage 1M is supplied through the oil passage 1K to back-pressure chambers 272, 282 and 292 of the accumulators 270, 280 and 290 through respective back-pressure ports 271, 281 and 291, thereby controlling the back pressure in these accumulators. The back pressure in turn is applied through the oil passage 1K to the upper land 193 of the spool 192, so that the latter is displaced downwardly as viewed in FIG. 3, thereby allowing the oil passage 1K to be communicated with a drain port 199 through an intermediate oil chamber 195, whereby the back pressure in the oil passage 1K is relieved.

As stated before, the manual valve 210 is operated manually by means of the shift lever (not shown) of the main transmission 10 disposed in the vicinity of the driver's seat. The shift lever is adapted to be operated manually by the driver so as to take one of the ranges P (parking), R (reverse), N (neutral), D (drive), S (second) and L (low) of the main shift position Mp. Table 1 shows the gear stages, i.e., the fourth (4), third (3) second (2) and first (1) gears obtainable in the respective ranges of the main shift position Mp, as well as the states of clutches and brakes corresponding to the respective gear stages.

TABLE 1

| MP | S1S2S3 | C1C2C0 | B1B2B3B0 | F1 | F2 | F3 |
|---|---|---|---|---|---|---|
| P | O X X | X X E | X X X X | f | f | f |
| R | O X X | X E E | X X E X | f | f | f |
| N | O X X | X X E | X X X X | f | f | f |
| D | | | | | | |
| 1 | O X X | E X E | X X X X | f | L | (L) |
| 2 | O O ③ | E X E | X E X X | L | f | (L) |
| 3 | X O ④ | E E E | X E X X | f | f | (L) |
| 4 | X X ④ | E E X | X E X E | f | f | f |
| S | | | | | | |
| 1 | O X X | E X E | X X X X | f | L | (L) |
| 2 | O O ④ | E X E | E E X X | (L) | f | (L) |
| 3 | X O ④ | E E E | X E X X | f | f | (L) |
| (3) | X X X | E E E | X E X X | f | f | (L) |
| L | | | | | | |
| 1 | O X X | E X E | X X E X | f | (L) | (L) |
| 2 | O O X | E X E | E E X X | (L) | f | (L) |
| (1) | X X X | E X E | X X E X | f | (L) | (L) |

In Table 1, marks O and X represent the fact that the solenoid valves S1 and S2 are energized and de-energized, respectively, whereas the mark ○ shows that the solenoid valve S3 is energized to lock-up the transmission system. The mark X appearing in the column of the solenoid valve S3 indicates that the solenoid valve S3 is de-energized to release the lock-up state. The symbol E shows that the clutches and the brakes are engaged, while the symbol X in the columns of clutches and brakes indicate that the clutches and brakes are released. The symbol L indicates that the one-way clutch is in the engaged state when the power is transmitted from the engine even though the power transmission is ensured also by a clutch or a brake connected in parallel with this one-way clutch, i.e., it indicates that the one-way clutch is locked. The symbol (L) shows that the one-way clutch is engaged only in the engine driving condition but is disengaged in the engine braking condition. Finally, the symbol f indicates that the clutch is in the free state.

Table 2 shows that states of communication between the oil passage 1 and the oil passages 2 to 6, as obtained in the respective positions of the shift lever of the main transmission 10.

TABLE 2

| | P | R | N | D | S | L |
|---|---|---|---|---|---|---|
| Oil Passage 2 | X | X | X | | | |
| Oil Passage 3 | X | X | X | X | | |
| Oil Passage 4 | X | X | X | X | X | |
| Oil Passage 5 | X | | X | X | X | X |
| Oil Passage 6 | X | | | | | |

In Table 2, a mark 0 shows establishment of the communication that allows delivery of the line pressure to the respective oil passages, whereas a mark X indicates that the respective oil passages are drained.

The operation of the main hydraulic controller 100 in response to the manual shifting operation of the manual valve 210 will be explained hereinunder.

When Manual Valve 210 Selects N or P Range

In this state, the oil passage 1 communicates with none of the oil passages 2 to 5, as will be seen from Table 2, and the first and second solenoid valves S1 and S2 are energized and de-energized, respectively, as shown in Table 1. The spool 222 of the 1-2 shift valve 220 is therefore displaced to the lower position by the force produced by the high level solenoid pressure, while the spool 232 of the 2-3 shift valve 230 takes the upper position under the force of the spring 231, thus allowing the line pressure to be supplied from the oil passage 1A to the lower oil chamber 244 of the 3-4 shift valve 240 and thereby upwardly displacing the spool 242 of the 3-4 shift valve 240. In this state, only the servomotor C-0 of the clutch C0 is communicated with the oil passage 1 through the 3-4 shift valve 240, oil passage 1F, flow-rate control valve 301 with check valve, and the oil passage 1E, while detouring the manual valve 210, so that only the clutch C0 is engaged.

When Manual Valve 210 Selects D Range

In this state, the line pressure is supplied to the oil passage 2, so that the clutch C1 is engaged.

The vehicle then starts with the first speed gear. Namely, when the D range is selected, the first solenoid valve S1 and the second solenoid valve S2 are energized and de-energized, respectively, as shown in Table 2 so that the spool 222 of the 1-2 shift valve 220 takes the lower position. In this state, the oil passages 3B and 2A leading to the brakes B1 and B2 are drained, and the oil passage 5C leading to the brake B3 is not supplied with oil, so that the brakes B1, B2 and B3 are released. At the same time, since the spool 232 of the 2-3 shift valve 230 is set at the upper position, the oil passage 1B is drained and the clutch C0 thereby disengaged. Meanwhile, the line pressure is supplied from the oil passage 1A to the lower oil chamber 244 of the 3-4 shift valve 240, so that the spool 242 is held at the upper position such as to maintain the clutch C0 in the engaged state by the oil pressure which is supplied from the oil passage 1 through the 3-4 shift valve 240 and the oil passage 1F. On the other hand, the oil passage 1B is drained so that the clutch C2 is disengaged and the brake B0 is released because the oil passage 1D is drained as a result of the supply of the line pressure to the oil passage 1F. In consequence, the power train is completed with the first speed gear, thereby starting the vehicle with the first speed gear.

Up-shift to the second speed gear is conducted in accordance with the state of running of the vehicle, in a manner which will be explained hereinunder.

When the vehicle running speed has reached a predetermined level, the computer 600 produces an output which allows the second solenoid valve S2 to be energized, so that the solenoid pressure acting in the upper oil chamber 224 of the 1-2 shift valve 220 is reduced to the low level, thereby causing the spool 222 of the 1-2 shift valve 220 to be moved upward, whereby the oil is supplied to the servomotor B-2 of the brake B2 from the oil passage 2, 1-2 shift valve 220, oil passage 2A, flow-rate control valve 308 with check valve, and the oil passage 2B, thus engaging the brake B2 and accomplishing the up-shift to the second speed gear.

As the vehicle speed is further increased, an up-shift to the third speed gear is effected in the following way. Namely, the computer 600 produces an output which serves to de-energize the first solenoid valve S1, so that the spool 232 of the 2-3 shift valve 230 is moved downwardly, thereby engaging the clutch C2 by the oil pressure which is supplied from the oil passage 1 through the 2-3 shift valve 230, oil passage 1B, shuttle valve 302, flow-rate control valve 303 with check valve and the oil passage 1P. Meanwhile, the line pressure is supplied from the oil passage 1C to the lower oil chamber 223 so as to fix the spool 222 of the 1-2 shift valve 220 at the upper position where it serves for speed other than the first speed.

For up-shifting to the fourth speed gear, the computer 600 produces an output which serves to de-energize the second solenoid valve S2 so that the solenoid pressure which has been supplied from the oil passage 1H to the upper oil chamber 243 of the 3-4 shift valve 240 is returned to the high level, thus allowing the spool 242 of the 3-4 shift valve 240 to be moved downwardly. As a result, the oil passage 1F is drained, while the oil passage 1D is supplied with the pressurized oil, so that the flow-rate control valve 305 with check valve is supplied with the pressurized oil through the oil passage 1G, whereby the clutch C0 is disengaged and the brake B0 engaged, thus accomplishing the up-shift to the fourth speed gear.

Manual Valve 210 Selects S Range

In this case, the line pressure is supplied not only to the oil passage 2 but also to the oil passage 3, as will be seen from Table 2, and the up-shift from the first speed gear to the second and third speed gears is conducted in the same manner as that in the case of the D range. However, up-shift to the fourth speed gear is prevented because the spool 242 of the 3-4 shift valve 240 is held at the upper position by the line pressure which is supplied to the lower oil chamber 244 of the 3-4 shift valve 240 from the oil passage 1 or the oil passage 3 through the 2-3 shift valve 230 and the oil passage 1A. When the second speed gear is selected, the line pressure is supplied to the servomotors of the clutches C0 and C1 and to the servomotor of the brake B2 as in the case of the D range. In addition, the line pressure is supplied also to the intermediate coast modulator valve 245 from the oil passage 3 through the 2-3 shift valve 230, oil passage 3A, 1-2 shift valve 220 and the oil passage 3D, so that pressurized oil of a pressure regulated by the intermediate coast modulator valve 245 is supplied to the oil passage 3B, thereby engaging the brake B1. Thus, the second speed in the S range permits the engine braking effect and affords a greater torque transmission capacity by virtue of the fact that both the brakes B2 and B1 are always held in the engaged state. It is to be understood also that, when the manual valve 210 is operated from the D range to the S range during running at fourth speed gear in the D range, the line pressure is introduced into the lower oil chamber 244 of the 3-4 shift valve 240, thereby effecting down-shift to the third speed gear without delay.

When Manual Valve 210 Selects L Range

In this case, the line pressure is supplied to the oil passages 2, 3 and 4 as will be seen from Table 2. The up-shift from the first speed gear to the second speed gear is conducted in the same manner as that in the D range but the up-shift to the third speed gear is prevented because the spool 232 of the 2-3 shift valve 230 is fixed at the upper position by the line pressure introduced into the lower oil chamber 233 of the 2-3 shift valve 230 from the oil passage 4. When the first speed gear is selected, the oil pressure is transmitted to the servomotor B-3 from the oil passage 4 through the 2-3 shift valve 230, oil passage 4A, low coast modulator valve 250, oil passage 4B, 1-2 shift valve 220 and the oil passage 5C, so that the brake B3 is held in the engaged state thereby allowing engine braking effect. When the second speed gear is selected, the operation is identical to that followed when the manual valve 210 selects the S range. It is to be understood also that, when the manual shift valve 230 is shifted to the L range during running with the third speed gear in the S range, down-shift to the second speed gear is effected without delay by the introduction of the line pressure into the lower oil chamber 233 of the 2-3 shift valve 230. Then, when the vehicle decelerates to a predetermined speed, the computer 600 produces an output for energizing the second solenoid valve S2, thereby effecting a down-shift from the second speed gear to the first speed gear.

When Manual Valve 210 Selects R Range

In this case, the pressure exists in the oil passage 5, while the oil passages 2, 3 and 4 are drained, as will be understood from Table 2. Since no pressure exists in the oil passages 2 and 3 leading to the servomotors of the clutch C1 and the brakes B1, B2, the clutch C1 and the brakes B1, B2 are released. The oil pressure supplied to the oil passage 5 is transmitted to the servomotor C-2 through the shuttle valve 302, flow-rate control valve 303 with check valve and the oil passage 1P, so that the clutch C2 is engaged. At the same time, the spool 222 of the 1-2 shift valve 220 is held in the upper position because the line pressure is supplied to the lower oil chamber 223 of this valve through the oil passage 1C, so that the line pressure is supplied to the oil passage 5C thereby engaging the brake B3. Meanwhile, the spool 232 of the 2-3 shift valve 230 is held in the upper position because the solenoid pressure acting in the upper oil chamber 243 of this valve reaches a low level as a result of energization of the first solenoid valve S1. Therefore, the line pressure is introduced from the oil passage 1 to the lower oil chamber 244 of the 3-4 shift valve 240 through the 2-3 shift valve 230 and the oil passage 1A, so that the spool 242 of the 3-4 shift valve is held in the upper position so as to allow the line pressure to be transmitted to the servomotor C-0 from the oil passage 1 through the 3-4 shift valve 240 and the oil passage 1F, thus engaging the clutch C0. At the same time, the oil passage 1D leading to the servomotor B-0 is drained so that the brake B0 is released, thus allowing reversing of the vehicle.

When the manual valve 210 is either in the D or S range, the line pressure is transmitted to the oil passage 2. If the spool 222 of the 1-2 shift valve 220 is in the upper position for speed ranges other than first speed, the line pressure is transmitted further to the oil passage 2A and is then introduced into the upper oil chamber 121 of the lock-up relay valve 120 through the oil passage 2D. When the line pressure exists in the upper oil chamber 121, if the third solenoid valve S3 is energized in response to the output from the computer 600 so as to maintain the pressure in the upper oil chamber 121 at the high level, the spool 122 of the lock-up relay valve 120 is moved downwardly, thereby bringing the oil passage 1Q into communication with the oil passage 6B. Consequently, the direct clutch 16 in the torque converter T is engaged, thereby switching the torque converter T into the direct-coupling state.

In contrast, if the line pressure does not exist in the oil passage 2A or if the solenoid pressure of the low level exists in the upper oil chamber 121 because of de-energization of the third solenoid valve S3 by the output of the computer 600, the spool 122 is held in the upper position by the force produced by the line pressure introduced into the lower oil chamber 124 from the oil passage 1. In this state, the oil passage 1Q is held in communication with the oil passage 1R, so that the direct clutch 16 in the torque converter T is held in the disengaged state.

When the spool 122 is held in the upper position, i.e., when the torque converter T is not locked up, the secondary line pressure (torque converter pressure) supplied from the torque converter T to the oil passage 1S is supplied to the oil cooler O/C through the lock-up relay valve 120 and the oil passage 1T. In contrast, when the spool 122 is held in the lower position, i.e., when the torque converter is locked up, the pressurized oil is supplied to the oil cooler O/C from the oil passage 1Q through the orifice 127 in the sleeve 125 and the oil passage 1T and also from the oil passage 1 through the orifice 126 in the sleeve 125 of the lock-up relay valve 120 and the oil passages 1U and 1T.

Figure 4:
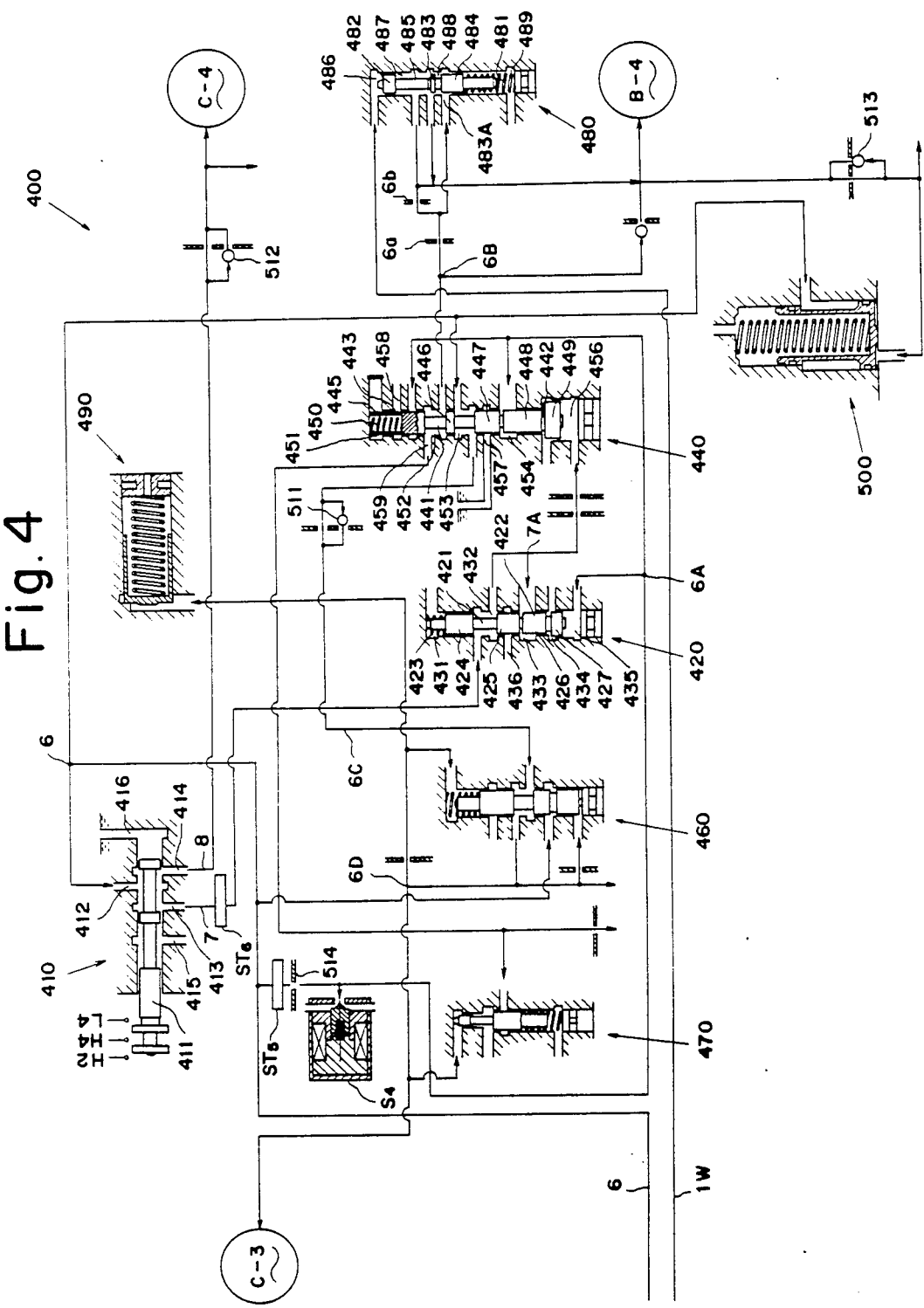
FIG. 4 is a hydraulic pressure circuit diagram of a hydraulic controller of a sub transmission.

FIG. 4 shows the detail of the sub hydraulic controller 400 for controlling the four-wheel drive sub transmission 50.

The sub hydraulic controller 400 is constituted by the following major parts: a transfer manual valve 410 operated manually by means of a shift lever provided in the vicinity of the driver's seat and adapted to distribute the pressurized oil supplied through the oil passage 6 of the main hydraulic controller 100 both to the oil passages 7 and 8; a relay valve 420; an inhibitor valve 440 for switching the states of engagement of the clutch C3 and the brake B4; a third accumulator control valve 460; a shift timing valve 470; an orifice control valve 480 for smoothing the engagement of the brake B4; an accumulator 490 for smoothing the engagement of the clutch C3; an accumulator 500 for smoothing the engagement of the brake B4; hydraulic servomotors C-3, C-4 and B-4 of the clutches C3, C4 and the brake B4; flow-rate control valves 511, 512 and 513 provided with check valves and adapted to control the flow rates of the pressurized oil flowing therethrough; oil strainers ST5 and ST6; a fourth solenoid valve S4 adapted to be selectively operated by an output from the computer 600; and oil passages providing communication between respective valves and servo cylinders of respective clutches and brakes.

The transfer manual valve 410 has a spool 411 which is directly connected to a shift lever (no shown) provided in the vicinity of the driver's seat. The transfer manual valve 410 also has an in-port 412 communicating with the oil passage 6 of the main hydraulic controller 100 for the main transmission 10, an out-port 413 communicating with the oil passage 7, an out-port 414 communicating with the oil passage 8, and drain ports 415 and 416. When the spool 411 of the transfer manual valve 410 is held in a two-wheel drive direct coupling (H2) position, the oil passage 6 is communicated with the oil passage 7, while the oil passage 8 is communicated with the drain port 416. When the spool 411 is held in a four-wheel drive direct coupling (H4) position, the oil passage 6 communicates with both the oil passage 7 and the oil passage 8. Finally, when the spool 411 is held in a reduced speed four-wheel drive (L4) position, the oil passage 6 is communicated with the oil passage 8, while the oil passage 7 is drained through the drain port 415.

The relay valve 420 has a spool 421 and a plunger 422 arranged in series with the spool 421. The spool 421 has lands 424 and 425 of an equal diameter and arranged at the upper and lower ends thereof, respectively, as viewed in FIG. 4, the upper land 424 being urged by a spring 423. The plunger 422 has an upper land 426 of the same diameter as the lands 424, 425 of the spool 421 and a lower land 427 of a diameter greater than the diameter of the upper land 426. The spool 421 and the plunger 422 in cooperation define an upper oil chamber 431 on the upper side of the upper land 424, a first intermediate oil chamber 432 between the upper land 424 and the lower land 425, a second intermediate oil chamber 433 between the spool 421 and the plunger 422, a third intermediate oil chamber 434 between the upper land 426 and the lower land 427, and a lower oil chamber 435 on the lower side of the lower land 427.

The operation of the relay valve 420 is as follows. When the pressurized oil is supplied to the lower oil chamber 435 from the oil passage 6A, the spool 421 and the plunger 422 are displaced upwardly, so that the oil passage 7 is brought into communication with the line pressure supply passage 7A through the first intermediate oil chamber 432, so that the supply and discharge of the line pressure to and from the lower oil chamber 456 of the inhibitor valve 440 is possible through the switching of the transfer manual valve 410. When the line pressure is supplied to the lower oil chamber 456 of the inhibitor valve 440 through the transfer manual valve 410 while the oil passage 7 is communicated with the line pressure supply passage 7A, the feedback pressure is supplied to the second intermediate oil chamber 433 so that the spool 421 is fixed at the upper position. In this state, if the solenoid valve S4 is energized in response to the output from the computer 600 so as to allow the lower oil chamber 435 to be drained, the plunger 422 alone is moved to the lower position, while the spool 421 remains in the upper position, so as to maintain the supply of the line pressure to the lower oil chamber 456 of the inhibitor valve 440. If the line pressure in the oil passage 7 is relieved through the transfer manual valve 410 in this state, or if the lower oil chamber 435 of the relay valve 420 is drained as a result of energization of the fourth solenoid valve S4 by the output from the computer 600 while the line pressure in the lower oil chamber 456 of the inhibitor valve 440 is being drained through the transfer manual valve 410 which provides communication between the oil passage 7 and the line pressure supply passage 7A, the spool 421 and the plunger 422 are displaced downwardly by the force produced by the spring 423 so as to bring the line pressure supply passage 7A into communication with the drain port 436 through the first intermediate oil chamber 432. When the spool 421 is held in the lower position, the supply and discharge of the line pressure to and from the lower oil chamber 456 of the inhibitor valve 440 through the transfer manual valve 410 does not proceed, so that the spool 441 and the plunger 442 of the inhibitor valve 440 are held in the lower positions as viewed in FIG. 4.

The inhibitor valve 440 has a spool 441 which is adapted to be moved between a first position which is on the lower side as viewed in FIG. 4 and a second position which is on the upper side as viewed in FIG. 4. The spool 441 serves as a change-over valve which conducts supply and discharge of the line pressure to and from the servomotors C-3 and B-4 of the clutch C3 and the brake B4 as it is moved between the lower first position and the upper second position. The inhibitor valve 440 also has a plunger 442 disposed in series with the spool 441 and adapted to be moved between a lower first position and an upper second position. The plunger 442, when located in the upper second position, holds the spool 441 in the second positon. The spool 441 has an upper sleeve-like land 445, a lower land 447 and an intermediate land 446 all having an equal diameter, and a spring 450 acting on the upper land 445 thus serving as means for setting the spool 441 in the first position. On the other hand, the plunger 442 has an upper land 448 of the same diameter as the lands of the spool 441, and a lower land 449 having a greater diameter than the upper land 448. Thus, the spool 441 and the plunger 442 define an upper oil chamber 451 on the upper side of the sleeve-like land 445, a first intermediate oil chamber 452 between the sleeve-like land 445 and the intermediate land 446, a second intermediate oil chamber 453 between the intermediate land 446 and the lower land 447, an oil chamber 454 between the spool 441 and the plunger 442, and a lower oil chamber 456.

The operation of this inhibitor valve 440 is as follows. When the spool 441 is held in the lower position, i.e., the first position, the upper oil chamber 451 is communicated with the oil passage 6A through an oil port 443 in the sleeve-like land 445, while the first intermediate oil chamber 452 and the second intermediate oil chamber 453 provide, respectively, communication between the line pressure passage 6 and a speed-reduction oil passage 6B and between a direct-coupling oil passage 6C and a drain port 457.

Conversely, when the spool 441 is held in the upper position, i.e., the second position, the upper oil chamber 451 is communicated with a drain port 458 through the oil port 443 formed in the sleeve-like land 445, while the first intermediate oil chamber 452 and the second intermediate oil chamber 453 provide, respectively, communication between the speed-reduction oil passage 6B and a drain port 459 and between the oil passage 6 and the direct-coupling oil passage 6C. On the other hand, the oil chamber 454 is communicated with an oil passage 6A which delivers oil pressure corresponding in degree to the signal supplied to the fourth solenoid valve S4. This oil pressure acting in the oil chamber 454 serves to normally bias the spool 441 to the second position, i.e., the upper position, while urging the plunger 442 to the first position, i.e., the lower position. An oil pressure maintained in the lower oil chamber 456 serves to normally maintain the plunger 442 in the second position, i.e., in the upper position.

The orifice control valve 480 is a control valve which regulates the pressure of the working oil supplied to the oil passage 6B and deliveres the regulated pressure to the hydraulic servomotor B-4. The orifice control valve 480 has a spool 485 which is biased upwardly by a spring 481. The spool 485 has an upper land 482, an intermediate land 483 and a lower land 484. The orifice control valve 480 has an upper oil chamber 486 on the upper side of the upper land 482, an upper intermediate oil chamber 487 between the upper land 482 and the intermediate land 483, a lower intermediate oil chamber 488 between the intermediate land 483 and the lower land 484, and a lower oil chamber 489 accommodating the spring 481. The spool 485 has an orifice 483A through which the upper intermediate oil chamber 487 is communicated with the lower intermediate oil chamber 488.

The upper oil chamber 486 is communicated with the oil passage 1W in the main hydraulic controller 100. The position of the spool 485 is changed in accordance with the balance between the force exerted by the spring 481 and the force produced by an oil pressure corresponding to the throttle opening and applied to the upper oil chamber 486, so as to deliver the line pressure in the oil passage 6B to the hydraulic servomotor B-4 while selectively making orifices 6a and 6b in the oil passage 6B effective.

The fourth solenoid valve S4 is controlled by the computer 600 such that it is switchable from the de-energized state to the energized state on condition that the shift lever (not shown) is in the L4 (reduced-speed four-wheel drive) range and that the state of running of the vehicle meets a predetermined condition, and from the energized state to the de-energized state on condition that the shift lever is in the H2 (two-wheel drive direct coupling) or H4 (four-wheel drive direct-coupling) range and that the state of running of the vehicle meets a predetermined condition. When de-energized, the fourth solenoid valve S4 acts to establish a solenoid pressure of high level equal to that of the line pressure in the oil passage 6A which communicates with the oil passage 2 through the orifice 514, whereas, when energized, it acts to drain the oil passage 6A, thereby generating a solenoid pressure of low level.

As stated before, the transfer manual valve 410 is operated by means of the shift lever of the sub transmission 50 provided in the vicinity of the driver's seat. This shift lever has sub shift positions Sp corresponding to the respective ranges of H2 (two-wheel drive direct-coupling), L2 (reduced-speed two-wheel drive), H4 (four-wheel drive direct-coupling) and L4 (reduced-speed four-wheel drive). The state of the brake B4 and the clutches C3 and C4, as well as the states of running of the vehicle, are shown in Table 3 in relation to respective ranges of the sub shift positions Sp.

TABLE 3

| Sp | S4 | C3 | B4 | C4 | Running Mode |
| --- | --- | --- | --- | --- | --- |
| H2 |   | X | E | X | L2 |
|   | α | E | X | X | H2 |
| H4 |   | X | E | E | L4 |
|   | α | E | X | E | H4 |
| L4 | X | E | X | E | H4 |

TABLE 3-continued

| Sp | S4 | C3 | B4 | C4 | Running Mode |
|---|---|---|---|---|---|
| | β | X | E | E | L4 |

In Table 3, the symbol α represents the fact that, once the solenoid valve S4 is de-energized, the direct coupling condition is maintained even if the solenoid valve S4 is energized thereafter, whereas the symbol β represents the fact that, once the solenoid valve S4 is energized, the reduced-speed coupling conditon is maintained even if the solenoid valve S4 is de-energized thereafter. The symbol E represents the fact that the clutch or the brake is held in the engaged state, while the symbol X represents the fact that the clutch or the brake is in the disengaged or released state.

Table 4 shows the respective states of communication between the oil passage 6 and the oil passages 7 and 8, in respective shift ranges of the sub transmission.

TABLE 4

| | H2 | H4 | L4 |
|---|---|---|---|
| Oil Passage 7 | | | X |
| Oil Passage 8 | X | | |

In Table 4, the mark 0 represents the fact that the oil passage is supplied with the line pressure, while the mark X represents the fact that the oil passage is drained.

The operations of the sub transmission 50 in respective ranges are as follows.

(A) When Transfer Manual Valve 410 Selects H2 Range

In this case, the oil passage 7 is supplied with the line pressure, while the oil passage 8 is drained. In consequence, the hydraulic servomotor C-4 is drained so as to disengage the clutch C4. In this state, the power of the engine is not transmitted to the sleeve 53, so that the vehicle runs in the two-wheel drive mode.

When the fourth solenoid valve S4 is de-energized in accordance with the output from the computer 600, the lower oil chamber 435 of the relay valve 420 is supplied with the solenoid pressure of high level, so that the spool 421 and the plunger 422 are held in the upper positions as viewed in the drawing, whereby the oil passage 7 and the line pressure supply passage 7A are communicated with each other through the relay valve 420, thereby allowing the line pressure signal to be applied to the lower oil chamber 456 of the inhibitor valve 440. In consequence, the spool 441 and the plunger 442 of the inhibitor valve 440 are held in the second positions, i.e., upper positions, so that the oil passage 6B and, hence, the hydraulic servomotor B-4 are drained to release the brake B4. Since the spool 441 and the plunger 442 of the inhibitor valve 440 are held in the upper positions, the oil passage 6C is communicated with the oil passage 6 and, hence, with the oil passage 6D through the third accumulator control valve 460, thereby supplying the line pressure to the hydraulic servomotor C-3 and thus engaging the clutch C3. The sub transmission 50 therefore operates in the H2 (two-wheel drive direct-coupling) range.

In this state, the spool 421 is fixed in the upper position by virtue of the line pressure fed back from the line pressure supply passage 7A to the second intermediate oil chamber 433 of the relay valve 420. Therefore, even if the fourth solenoid valve S4 is energized to supply the solenoid pressure of the low level to the lower oil chamber 435, the plunger 422 alone is moved to the lower position while the spool 421 remains in the upper position, thus maintaining the supply of the line pressure signal to the lower oil chamber 456 of the inhibitor valve 440. Thus, the sub transmission 50 is maintained in the H2 (two-wheel drive direct-coupling) range, even though the fourth solenoid valve S4 is energized.

(B) When Transfer Manual Valve 410 Selects H4 Range

In this case, the line pressure is supplied both to the oil passages 7 and 8. When the fourth solenoid valve S4 is de-energized in response to the output of the computer 600, the solenoid pressure of high level is supplied to the lower oil chamber 435 of the relay valve 420, so that the spool 421 and the plunger 422 are held in the upper positions so as to provide communication between the oil passage 7 and the line pressure supply passage 7A, thereby allowing the line pressure to be supplied to the lower oil chamber 456 of the inhibitor valve 440. Consequently, the spool 441 and the plunger 442 of the inhibitor valve 440 are held in the second positions, i.e., upper positions, so that the oil passage 6B and, hence, the hydraulic servomotor B-4 are drained through the drain port 459, thereby releasing the brake B4.

Meanwhile, the oil passage 6C is held in communication with the oil passage 6 because the spool 441 and the plunger 442 of the inhibitor valve 440 are held in the second or upper positions. The oil passage 6C is communicated also with the oil passage 6D through the third accumulator control valve 460. Therefore, the line pressure is supplied to the hydraulic servomotor C-3, thereby engaging the clutch C3. On the other hand, the line pressure supplied to the oil passage 8 is introduced into the hydraulic servomotor C-4, thereby engaging the clutch C4, and thus allowing the sub transmission 50 to operate in the H4 (four-wheel drive direct-coupling) range.

In this state, the line pressure is fed back to the second intermediate oil chamber 433 of the relay valve 420 from the line pressure supply passage 7A, so that the spool 421 is fixed in the upper position. When the fourth solenoid valve S4 is energized in this state, the plunger 422 alone is moved downwardly, while the spool 421 remains in the upper position, thereby maintaining the supply of the line pressure to the lower oil chamber 456 of the inhibitor valve 440 and, hence, the H4 (four-wheel drive direct-coupling) range of the sub transmission 50.

(C) When Transfer Manual Valve 410 Selects L4 Range

In this case, the oil passage 7 is drained, while the oil passage 8 is supplied with the line pressure, as will be seen from Table 4. Thus, the oil passages 7 and 7A are drained, while the oil passage 8 is supplied with the line pressure, regardless of the position of the relay valve 420, so that the clutch C4 is engaged to maintain the four-wheel drive mode of the sub transmission 50.

When the transfer manual valve 410 is shifted from the high speed range H2 or H4 down to the low speed range L4, if the fourth solenoid valve S4 is de-energized in response to the output from the computer 600, the solenoid pressure of high level is supplied from the oil passage 6A to the oil chamber 454 of the inhibitor valve 440, while the line pressure which has been supplied to the lower oil chamber 456 of the same valve is drained through the oil passage 7A, relay valve 420, oil passage 7 and the transfer manual valve 410. In consequence, the plunger 442 of the inhibitor valve 440 is moved to the first or lower position, but the spool 441 of the same valve remains in the second or upper position so as to maintain the H4 (four-wheel drive direct-coupling) range of the sub transmission 50.

If the fourth solenoid valve S4 has been energized in response to the output of the computer 600 when the transfer manual valve 410 is shifted to the L4 range, or if the fourth solenoid valve S4 is switched from the de-energized state to the energized state while the transfer manual valve 410 has been set in the L4 range, the solenoid pressure supplied to the oil passage 6A is changed to the low level, so that the spool 441 of the inhibitor valve 440 is set in the first or lower position by the force of the spring 450. As a result, the oil passage 6B is brought into communication with the oil passage 6, so that the hydraulic servomotor B-4 is supplied with the line pressure through the orifice 6a, orifice 6b or the orifice control valve 480, thereby engaging the brake B4. On the other hand, the oil passage 6C is communicated with the drain port 457 through the first intermediate oil chamber 452, so that the hydraulic servomotor C-3 is drained so as to disengage the clutch C3, thereby shifting the sub transmission 50 to L4 (reduced-speed four-wheel drive) range. Once the L4 range is attained, the spool 441 of the inhibitor valve 440 is not moved even if the fourth solenoid valve S4 is de-energized, because the solenoid pressure of high level established in the oil passage 6A is supplied not only to the oil chamber 454 of the inhibitor valve 440 but also to the upper oil chamber 451 of the same valve through the oil port 443 in the sleeve-like land 445 of the spool 441, so that the sub transmission 50 is maintained in the L4 (reduced-speed four-wheel drive) range.

(D) When Transfer Manual Valve 410 is Shifted to H2 or H4 Range From L4 Range While Sub Transmission 50 is in Reduced-Speed Four-Wheel Drive Mode In this case, if the fourth solenoid valve S4 has been energized by the output from the computer 600, the lower oil chamber 435 of the relay valve 420 is drained so that the spool 421 and the plunger 422 are held as a unit in the lower positions by the force of the spring 423. Therefore, the communication between the oil passage 7 and the oil passage 7A is interrupted by the upper land 424 and the lower oil chamber 456 of the inhibitor valve 440 is drained. In consequence, the spool 441 and the plunger 442 of the inhibitor valve 440 are held in the lower position by the force of the spring 450. As a result, the clutch C3 is released while the brake B4 is engaged, so that the sub transmission 50 is held in L2 (reduced-speed two-wheel drive) or L4 (reduced-speed fourth-wheel drive) range.

However, when the fourth solenoid valve S4 is de-energized by the output of the computer 600, the solenoid pressure of high level is introduced into the lower oil chamber 435 of the relay valve 420 as stated before, so that the spool 421 and the plunger 422 of the relay valve 420 are moved to the upper positions so as to provide communication between the oil passage 7 and the line pressure supply passage 7A. This in turn permits the line pressure to be supplied to the lower oil chamber 456 of the inhibitor valve 440, so that the spool 441 and the plunger 442 are moved to and held in the second or upper positions. As a result, the oil passage 6B is brought into communication with the drain port 459 and, hence, drained, so as to release the brake B4. Meanwhile, the oil passage 6C is communicated with the oil passage 6 because the spool 441 and the plunger 442 are held in the upper positions. In consequence, the oil passage 6 is brought into communication with the oil passage 6D through the third accumulator control valve 460, so that the clutch C3 is engaged to change-over the sub transmission 50 to the H2 (two-wheel drive direct-coupling) range or H4 (four-wheel drive direct-coupling) range.

Figure 5:
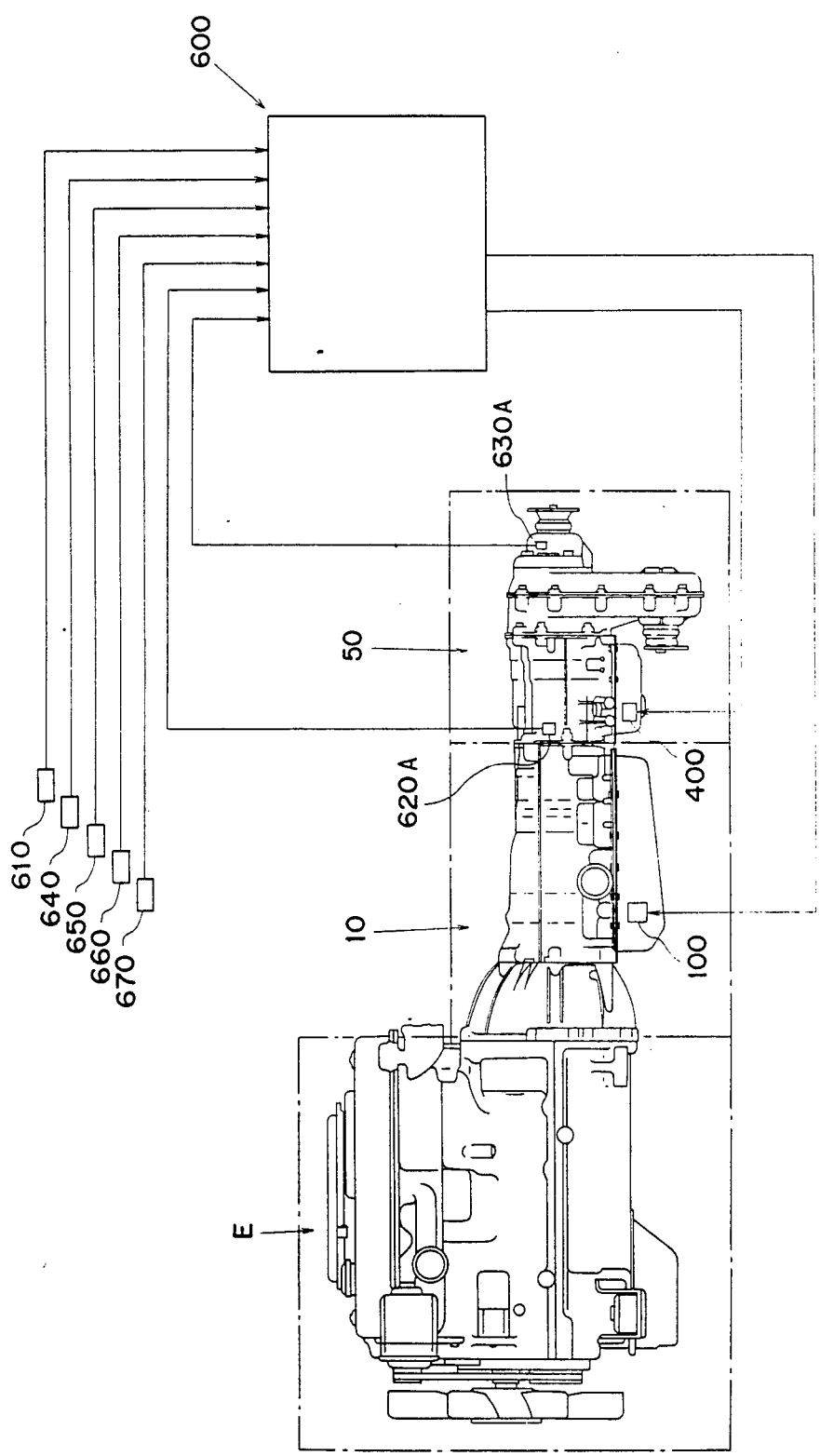
FIGS. 5 and 6 are block diagrams of a computer.
Figure 6:
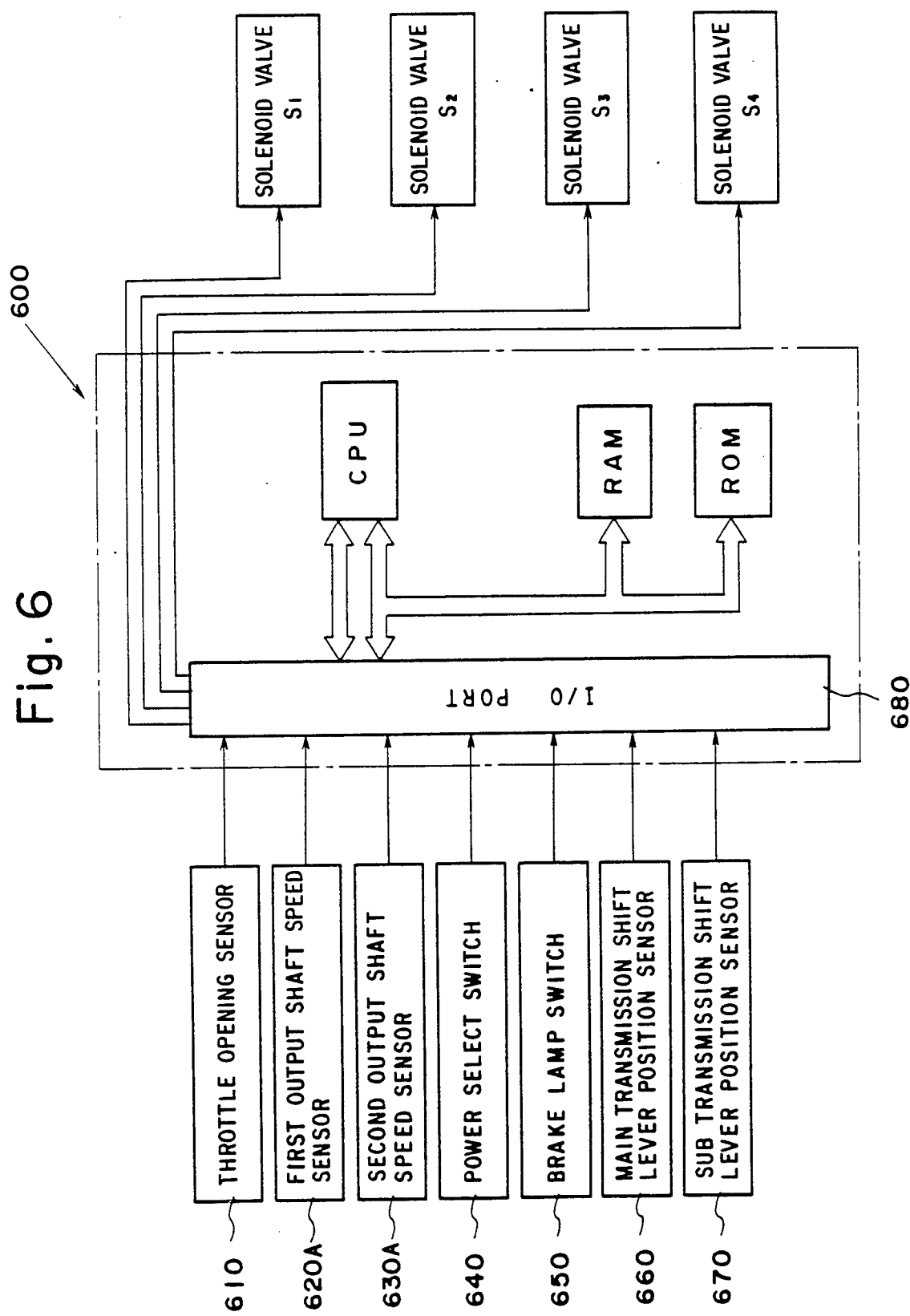

FIGS. 5 and 6 are block diagrams of an electronic controller or a computer which conducts the shift control of the four-wheel drive automatic transmission.

The computer 600 which controls the main hydraulic controller 100 and the sub hydraulic controller 400 by energizing and de-energizing the solenoid valves S1 to S4 is composed of: a throttle opening sensor 610 for detecting the amount by which the accelerator pedal is depressed; a first output shaft speed sensor 620A for detecting the rotational speed of the output shaft 32 of the main transmission by the reed switch 42 contained in the first output shaft speed detecting means 620; a second output shaft speed sensor 630A for detecting the rotational speed of the first output shaft 52 of the sub transmission 50 by means of the driven gear 65 contained in the second output shaft speed detecting means 630 and converting the detected signal to a vehicle running speed; a power select switch 640 for changing over between the shift patterns such as, e.g., economy, normal and power, in accordance with the selection of the driver; a brake lamp switch 650; a main transmission shift lever position sensor 660 for detecting the position (Mp) of the set range of the main transmission 10; a sub transmission shift lever position sensor 670 for detecting the position (Sp) of the set range of the sub transmission 50; an I/O port 680 which is an input port for these factors representing the state of running of the vehicle and is also an output port to the solenoid valves S1 to S4; a central processing unit CPU; a random access memory RAM for shift point processing; and a read only memory ROM for storing shift pattern data such as shift points and lock-up points.

Figure 7:
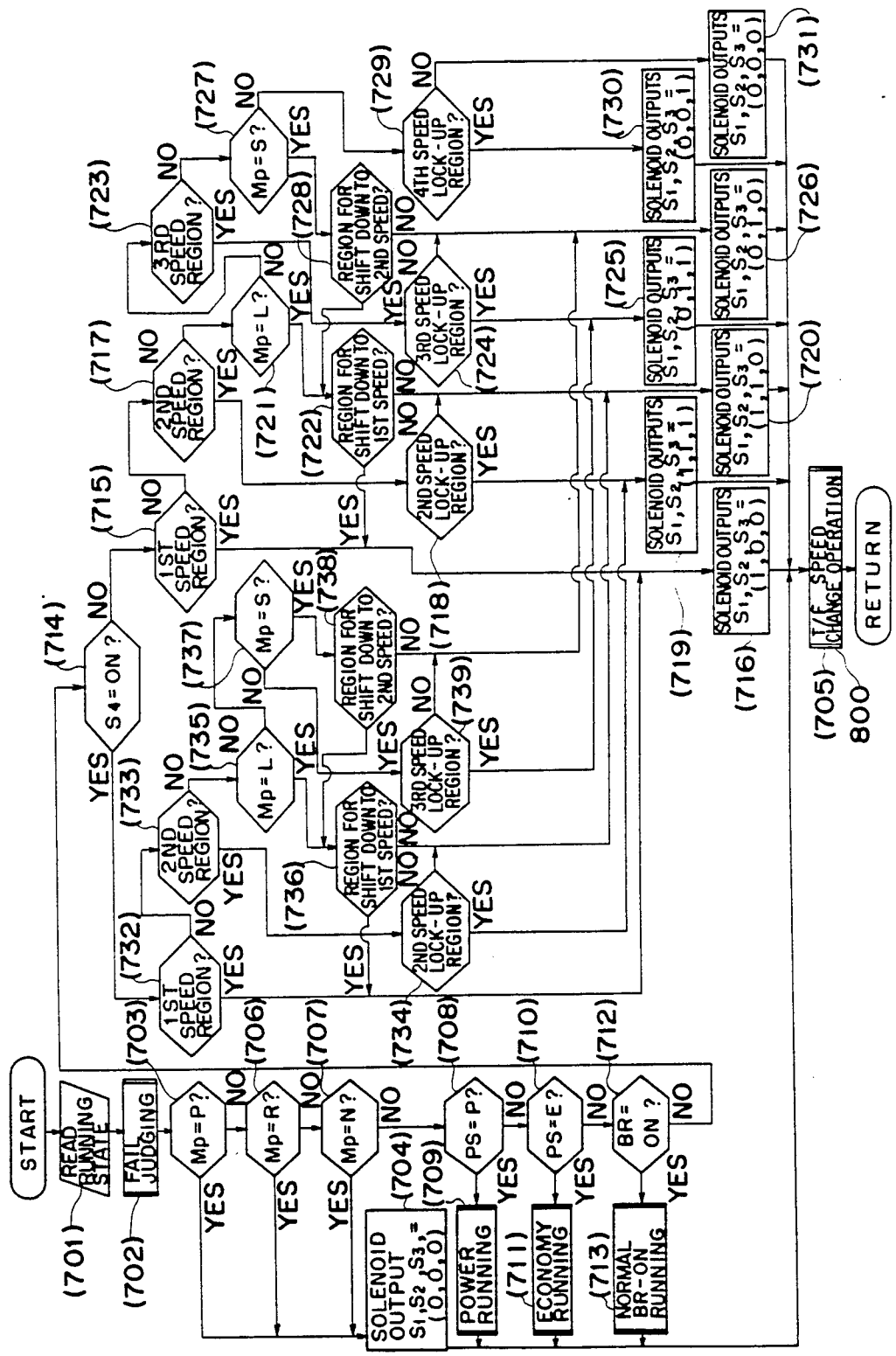
FIG. 7 is a flowchart showing the operation of shift control according to the present invention.

Shift control will be explained with reference to the flowchart shown in FIG. 7.

The ignition switch (not shown) of a vehicle is turned "ON" to start the engine E of the vehicle. Various factors representing the running state of the vehicle are read by those such as the throttle opening sensor 610, the first output shaft speed sensor 620A, the second output shaft speed sensor 630a, the power select switch 640, the brake lamp switch 650, the main transmission shift lever position sensor 660, and the sub transmission shift lever position sensor 670 (701). Judgement (702) is made as to whether the first output shaft speed detecting means 620 is malfunctioning. If so, the process proceeds to the fail judge 800 in which the shift control is made on the basis of the rotational speed of the output shaft which is detected by the second output shaft speed detecting means 630. Then, judgement (703) is conducted as to whether or not the present shift position (Mp) of the main transmission 10 is set in the P (parking) range. In the case of YES (when the shift position Mp is set in the P range), an output which de-energizes (indicated by the numeral 0) the solenoid valves S1, S2 and S3 is produced (704), and thereafter the step 705 is executed. In the case of NO (when the shift position Mp is not set in the P range), whether the shift position Mp is set in the R (reverse) range or not is decided (706). In the case of YES (when the shift position Mp is set in the R range), the step 704 is conducted, and in the case of NO (when the shift position Mp is not set in the R range), decision is made as to whether the shift position Mp is set in the N (neutral) range or not (707). In the case of YES (when the shift position Mp is set in the N range), the step 704 is conducted, and in the case of NO (when the shift position Mp is not set in the N range), decision instruction is executed as to whether the power select position PS is set in the power P or not (708). In the case of YES (when the power select position PS is set in the power P), the power running is carried out in which speed change is controlled by a shift pattern in which the shift point is set at a comparatively high point (709), and thereafter the step 705 is executed. In the case of NO (when the power select position is not set in the power P), whether the power select position PS is set in the economy E or not is decided (710). In the case of YES (when the power select position PS is set in the economy E), the economy running is carried out in which speed change is controlled by a shift pattern in which the shift point is set at a comparatively low point (711), and thereafter the step 705 is executed. In the case of NO (when the power select position PS is not set in the economy E but at the normal N), decision is made as to whether the brake lamp switch 650 is ON or not (712). In the case of YES (when the brake lamp switch 650 is ON), the normal brake lamp energized running is carried out in which speed change is controlled in a shift pattern in which the shift point is set at a comparatively high point (713), and thereafter the process proceeds to the step 705. In the case of NO (when the brake lamp switch 650 is OFF), whether the fourth solenoid valve S4 is in the energized state or not is decided (714) in order to judge the speed mode of the sub transmission 50 which is represented in this embodiment by the energized or de-energized state of the fourth solenoid valve S4 (the energized state of the solenoid valve S4 indicates that the sub transmission 50 is set in the reduced speed mode, whereas the sub transmission 50 is set in the direct-coupling mode, if the solenoid valve is in the de-energized state). In the case of NO (when the fourth solenoid valve S4 is in the de-energized state), decision instruction (715) is executed as to whether or not the state of the running of the vehicle is in the first speed region in the shift pattern in which the power select position PS is set at the normal and the sub transmission 50 is the directly-coupled mode. In the case of YES (in the first speed region), an output is generated which energizes (indicated by the numeral 1) the solenoid valve S1 alone and de-energizes the solenoid valves S2 and S3 (716), and thereafter the step (705) is executed. In the case of NO (in a region other than the first speed region), decision (717) is given as to whether or not the state of the running of the vehicle is in the second speed region in the shift pattern in which the power select position PS is set at the normal and the speed mode of the sub transmission 50 is the directly-coupled mode. In the case of YES (in the second speed region), decision (718) is made as to whether the state of the running of the vehicle is in the second speed direct clutch engageable region or not at the lock-up point when the power select position PS is the normal and the mode of the sub transmission 50 is the directly-coupled mode. In the case of YES (in the second speed direct clutch engageable region), an output which energizes the solenoid valves S1, S2 and S3 is produced (719), while in the case of NO (in a region other than the second speed region) in the step of 718, an output which energizes the solenoid valves S1, S2 and de-energizes the solenoid valve S3 is produced (720), and thereafter the process proceeds to the step 705. In the case of NO (in a region other than the second speed region) in the step (717), whether or not the shift position Mp is set in the L (low) range is determined (721). In the case of YES (when the shift position Mp is set in the L range), whether the state of the running of the vehicle is in the region for shift-down to first speed or not is judged (722). In the case of YES (in the region for shift-down to first speed), the process proceeds to the step 716, whereas in the case of NO (in a region other than the region for shift-down to first speed), the process proceeds to the step 720. In the case of NO (when the shift position Mp is not set in the L range) in the step 721, decision 723 is given as to whether or not the state of the running of the vehicle is in the third speed region in the shift pattern in which the power select position PS is the normal and the mode of the sub transmssion 50 is the directly coupled mode. In the case of YES (in the third speed region), decision 724 is made as to whether the state of the running of the vehicle is in the third speed direct clutch engageable region or not at the lock-up point when the power select position PS is,the normal and the mode of the sub transmission 50 is the directly coupled mode. In the case of YES (in the third speed direct clutch engageable region), an output which energizes the solenoid valves S2 and S3 and de-energizes the solenoid valve S3 is produced (725), whereas in the case of NO (in a region other than the third speed direct clutch engageable region) in the step of 724, an output which energizes the solenoid valve S2 and de-energizes the solenoid valves S1 and S3 is produced (726), and thereafter the process proceeds to the step 705. In the case of NO (in a region other than the third speed region) in the step (723), whether the shift position Mp is set in the range S (second) or not is judged (727). In the case of YES (when the shift position Mp is set in the S range), whether the state of the running of the vehicle is in the region for shift-down to second speed or not is judged (728). In the case of YES (in the region for shift-down to second speed), the process proceeds to the step 722, whereas in the case of NO (in a region other than the region for shift-down to second speed) in the step of 728, the process proceeds to the step 726. In the case of NO (when the shift position Mp is not set in the S range) in the step 727, namely, when the state of the running of the vehicle is in the fourth speed region, decision (729) is made as to whether the state of the running of the vehicle is in the fourth speed direct clutch engageable region or not at the lock-up point when the power select position PS is the normal and the mode of the sub transmission 50 is the directly coupled mode. In the case of YES (in the fourth speed direct clutch engageable region), an output which energizes the solenoid valve S3 and de-energizes the solenoid valves S1 and S2 is produced (730), whereas in the case of NO (in a region other than the fourth speed direct clutch engageable region), an output which de-energizes the solenoid valves S1, S2 and S3 is produced (731), and thereafter the step (705) is executed. In the case of YES (when the solenoid valve S4 is energized) in the step of 714, decision instruction (732) is carried out as to whether or not the state of the running of the vehicle is in the first speed region in the shift pattern in which the power select position PS is the normal and the mode of the sub transmission 50 is the reduced-speed mode. In the case of YES (in the first speed region), the process proceeds to the step 715, whereas in the case of NO (in a region other than the first speed region), decision (733) is made as to whether or not the state of the running of the vehicle is in the second speed region in the shift pattern in which the power select position PS is the normal and the mode of the sub transmission 50 is the reduced-speed mode. In the case of YES (in the second speed region), decision instruction (734) is executed as to whether or not the state of the running of the vehicle is in the second speed direct clutch engageable region at the lock-up point when the power select position PS is the normal and the mode of the sub transmission 50 is the reduced-speed mode. In the case of YES (in the second speed direct clutch engageable region), the process proceeds to the step 719, whereas in the case of NO (in a region other than the second speed direct clutch engageable region) in the step of 734, the process proceeds to the step 720. In the case of NO (in a region other than the second speed region) in the step of 733, whether or not the shift position Mp is set in the L range is determined (735). In the case of YES (when the shift position Mp is set in the L range), whether the state of the running of the vehicle is in the region for shift-down to first speed or not is judged (736). In the case of YES (in the region for shift-down to first speed), the process proceeds to the step 716. In the case of NO (in a region other than the region for shift-down to first speed) in the step of 736, the process proceeds to the step 720. In the case of NO (when the shift position Mp is not set in the L range) in the step of 735, whether the shift position Mp is set in the S range or not is decided (737). In the case of YES (when the shift position Mp is set in the S range), whether the state of the running of the vehicle is in the region for shift-down to second speed or not is decided (738). In the case of YES (in the region for shift-down to second speed), the process proceeds to the step 736, whereas in the case of NO (in a region other than the region for shift-down to second speed) in the step of 738, the process proceeds to the step 726. In the case of NO (when the shift position Mp is not set in the S range) in the step of 737, decision (739) is given as to whether the state of the running of the vehicle is in the third speed direct clutch engageable region or not at the lock-up point when the power select position PS is the normal and the mode of the sub transmission 50 is the reduced speed mode. In the case of YES (in the third speed direct clutch engageable region), the process proceeds to the step 725, whereas in the case of NO (in a region other than the third speed direct clutch engageable region), the process proceeds to the step 726. In the step of 705, a transfer shifting process 800 is conducted in which shift control is conducted in accordance with the speed change in the sub transmission 50.

Figure 8:
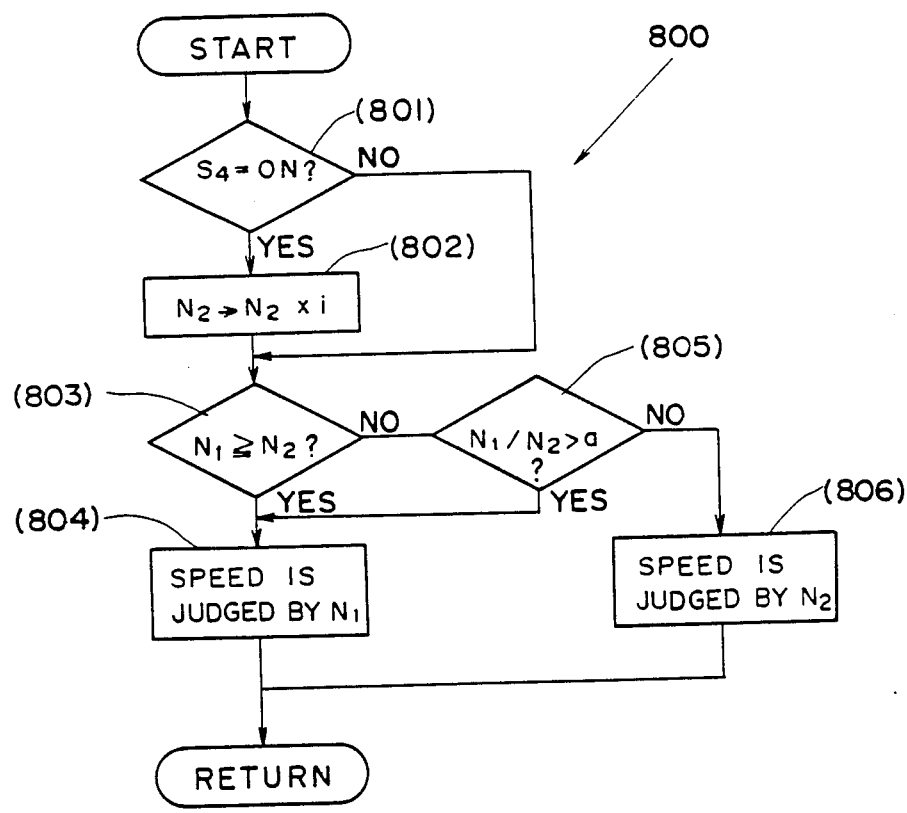
FIG. 8 is a flowchart of the subroutine of the fail judge for a first output shaft speed detecting means.

FIG. 8 shows the flowchart of the subroutine of the first output shaft speed detecting means fail judge 800.

First, judgement is made as to whether or not the solenoid valve S4 is in an energized state (801). If YES (when the solenoid valve S4 is in an energized state), it is determined that the sub transmission 50 is set in the low speed mode, and the rotational speed $N_2$ of the second output shaft 52 which is read by the second output shaft speed detecting sensor 630A is obtained by multiplying the same by the gear ratio i of the low speed mode of the sub transmission 50 {i=1+1/(number of teeth of the sun gear 56/number of teeth of the ring gear 58)} (802), and then the step of 803 is executed. In the case of NO (when the solenoid valve S4 is in a de-energized state), it is determined that the mode of the sub transmission 50 is in the directly coupled speed mode (gear ratio 1), and then the step 803 is executed. In the step of 803, judgement is made as to whether or not the rotational speed $N_1$ of the output shaft 32 of the main transmission 10 which is read by the first output shaft speed detecting sensor 620A is larger than the rotational speed $N_2$. If the result is YES (when the rotational speed $N_1$ is larger than the rotational speed $N_2$), it is determined that the rotational speed $N_1$ be employed as the speed of the output shaft by which the shift control of the main transmission 10 is conducted (804), and the process returns. If NO (when the rotational speed $N_1$ is smaller than the rotational speed $N_2$), judgement is made as to whether the rotational speed $N_1$/rotational speed $N_2$ is larger than a predetermined value a (805). If the result is YES (when $N_1/N_2 > a$), it is decided that the output of the first output shaft speed detecting sensor 620A is normal, and then the step 804 is executed. In the case of NO (when $N_1/N_2 \leq a$), it is determined that the first output shaft speed detecting sensor 620A is malfunctioning, and that the rotational speed $N_2$ be employed as the speed of the output shaft by which the shift control of the main transmission 10 is conducted (806), and then the process returns.

Figure 9:
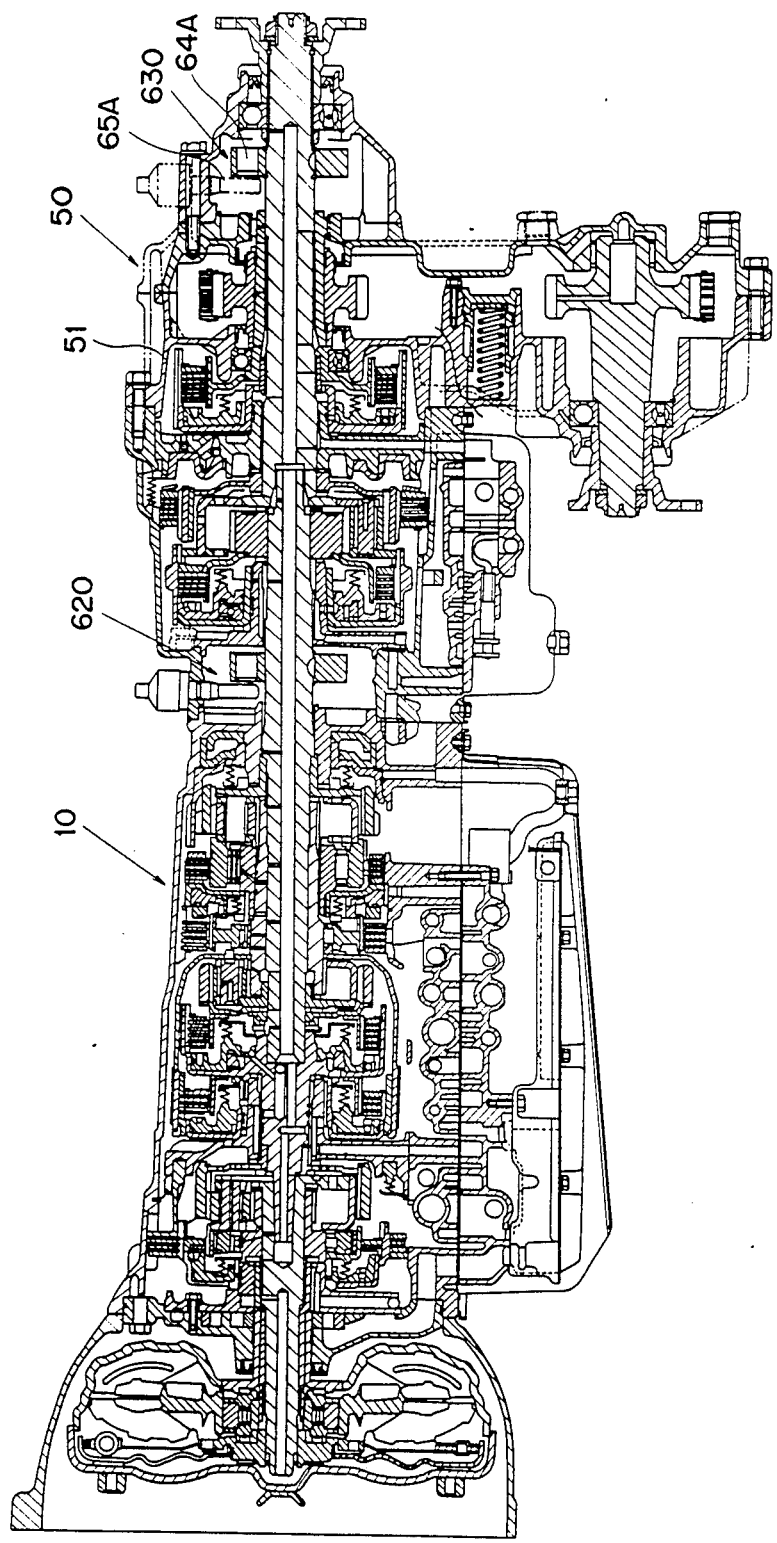
FIG. 9 is a sectional view of another embodiment of a four-wheel drive transmission system according to the present invention.

FIG. 9 is a sectional view of another embodiment of a four-wheel drive transmission system according to the present invention.

The second output shaft speed detecting means 630 of this embodiment is composed of, like the first output shaft speed detecting means 620, a rotor 64A and a reed switch 65A in place of the drive gear 64 and the driven gear 65 employed in the above-mentioned embodiment. The rotor 64A contains a permanent magnet, and is secured by means of a Woodruffkey, snap ring or other fastening means on the outer peripheral surface of the first output shaft 52 at the rear end of the sub transmission case 51 of the sub transmission 50. The reed switch 65A is connected to the computer 600, and is energized when the permanent magnet contained in the rotor 64A approaches the switch and is de-energized when the magent is separated therefrom. The reed switch 65A is mounted to the sub transmission case 51 in such a manner as to be located at the side of the rotor 64A which is closer to the transfer mechanism 55 and not to be in contact with the rotor 64A. Thus, accurate detection of the rotational speed of the first output shaft 52 of the sub transmission 50 can be effected.

Although the invention has been described through its preferred forms, it is to be understood that the described embodiments are only illustrative and various changes and modifications may be imparted thereto. In the above-mentioned embodiments, for instance, the mode of the sub transmission (which is constituted by the high speed mode and the low speed mode in thess embodiments) is detected by determining whether or not the solenoid valve S4 is energized. The mode of the sub transmission 50 may be detected through other methods, for example, be means of the position of the spool 441 of the inhibitor valve 440 of the sub hydraulic controller 400, the engagement of the clutch C3 or the brake B4, the oil pressure of the servomotor C-3 or the servomotor B-4, the state of the drive of the planetary gear device P3 (for example, the rotation of the ring gear 58 and the carrier 59), or by means of the shift position of the shift change mechanism employing a plurality of gear trains.

The planetary gear type speed change gears in the sub transmission of the described embodiments may be substituted by other types of speed changing mechansim which employ a plurality of meshing spur gear trains, stepless speed change gear, and so forth.

It is to be understood also that the described four-wheel drive transfer employing the sub transmission for transmitting power to front wheels and rear wheels is only illustrative and the invention can apply equally well to any type of transmission system which has a main transmission (shift change mechanism) and a sub transmission (speed change mechanism).

What we claim is:

1. A control device for an automatic transmission having a main transmission, a sub transmission connected to an output shaft of the main transmission, and electronic control means for controlling the speed changing ratios of the main and sub transmissions, wherein the electronic control means comprises:

means for inputting a signal representing a running state of a vehicle and controlling the speed changing ratios of the main and sub transmissions;

speed changing ratio detecting means for detecting the speed changing ratio of the sub transmission;

first output shaft speed detecting means for detecting the rotational speed of the output shaft of the main transmission;

second output shaft speed detecting means for detecting the rotational speed of the output shaft of the sub transmission;

means for adjusting a signal of the second output shaft speed detecting means when the speed changing ratio detecting means judges that the speed changing ration of the sub transmission is in a reduced speed range; and means for effecting speed change control of the main transmission by selecting either a signal of the first output shaft speed detecting means and the signal of the second output shaft speed detecting means as a result of comparison between the signal of the first output shaft speed detecting means and the signal of the second output shaft speed detecting means.

2. The control device for an automatic transmission as in claim 1, wherein said first output shaft speed detecting means is adapted to detect the rotational speed of the input shaft of said sub transmission, said sub transmission being coupled to the rear end of said main transmission which has the output shaft constituting said input shaft of said sub transmission.

3. The control device for an automatic transmission as in claim 1, wherein said first output shaft speed detecting means is adapted to control the shift points of said main transmission.

4. The control device for an automatic transmission as in claim 1, wherein said second output shaft speed detecting means is adapted to detect the vehicle running speed.

* * * * *